United States Patent [19]

Karmi

[11] Patent Number: 5,884,157
[45] Date of Patent: Mar. 16, 1999

[54] METHOD AND APPARATUS FOR SUPPORTING MULTIPLE SERVICE PROVIDERS USING SINGLE MOBILE SWITCHING CENTER

[75] Inventor: Gadi Karmi, La Jolla, Calif.

[73] Assignee: QUALCOMM Incorporated, San Diego, Calif.

[21] Appl. No.: 692,289

[22] Filed: Aug. 2, 1996

[51] Int. Cl.[6] ............................ H04M 15/00; H04M 3/42
[52] U.S. Cl. ............................................. 455/406; 455/414
[58] Field of Search ..................................... 455/406, 433, 455/461, 466, 422, 435, 432, 445, 414, 552, 553, 550

[56] References Cited

U.S. PATENT DOCUMENTS 5,297,189  3/1994  Chabernaud .............................. 455/414
5,353,331 10/1994  Emery et al. ............................ 455/461
5,629,947  5/1997  Rajala et al. ............................ 455/466

*Primary Examiner*—Dwayne D. Bost
*Assistant Examiner*—Tracy M. Legree

*Attorney, Agent, or Firm*—Russell B. Miller; Bruce W. Greenhaus; Kent D. Baker

[57] ABSTRACT

An HLR Interface Facility (HIF) is disclosed which is disposed between the HLR and the different customer service data bases. The HIF resolves the two problems associated with the single HLR solution. It provides controlled access to the HLR, preventing secondary service providers from accessing or modifying each other's subscriber records.

The HIF also offers interworking facilities, allowing to independently modify the interface into the HLR, and the new interface point between different customer service data bases and the HIF. Therefore, if a new feature is introduced in the MSC and only some of the secondary service providers wish to make use of it, only the interfaces between their customer service data bases and the HIF need modification while the other resellers need not change their own interfaces to the HIF.

In addition, a means for interfacing the billing output of the MSC to the multiple billing centers is disclosed.

4 Claims, 2 Drawing Sheets

METHOD AND APPARATUS FOR SUPPORTING MULTIPLE SERVICE PROVIDERS USING SINGLE MOBILE SWITCHING CENTER

BACKGROUND OF THE INVENTION

I. Field of the Invention

The present invention relates to communication systems. More particularly, the present invention relates to a novel and improved method and apparatus for allowing multiple secondary service providers to use the infrastructure of a single service provider.

II. Description of the Related Art

As the market for wireless communications grows there has been an increase in the number of service providers capable of serving a given area, as well as, an increase in the number of hardware providers supplying the hardware to meet the needs of that area. In order to differentiate themselves and to improve the service to their customers, service providers are offering an increasingly large number of services to their customers.

In their drive to provide better service to their users, service providers are giving their customers digital transmission, which provides improved perceptual quality, additional features and additional system capacity. Code division multiple access (CDMA) modulation techniques is one of several digital transmission techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems.

The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

In typical implementations, the MSC (mobile switching center) communicates with an HLR (home location register) before providing services to the user. The HLR is a database indicating among other things the services to which the user subscribes and services which the user is permitted to use. The transfer of data between the HLR and the MSC is well known in the art and is described in detail in the Telecommunications Industry Interim Standard TIA/EIA/IS-41-C Cellular Radio Telecommunications Intersystem Operation.

In the recent bandwidth auctions conducted by the Federal Communications Commission (FCC), companies bought the rights to use available bandwidth to provide wireless communications. Companies that bid and obtain the right to use the bandwidth may elect to either "retail" the services facilitated by it, building a customer base, billing facilities and so on. This is the approach undertaken by most companies to date.

An alternative approach is "wholesaling" services to other service providers that would then retail those services to their existing customers or use it to enlarge their customer base. In the present invention, the term "primary service provider" will be used to denote the company that bid and obtained the spectrum, and "secondary service provider" will be used to denote companies that purchase the right to use spectrum and mobile switching center/base station transceiver subsystem (MSC/BTS) facilities from the primary service provider for further reselling to actual customer (a common industry term for the latter is "resellers").

When the primary service provider decides to market its facilities to secondary service providers, the issue of interface between the customer service data base, the Home Location Register (HLR), and the Mobile Switching Center (MSC) arises. FIG. 1 presents these interfaces for the common case where only a single primary service provider makes use of an MSC. Communications between mobile switching center (MSC) 2 and home location register (HLR) 4 typically make use of a standardized interface provided by the Telecommunications Industry Association in TIA/EIA/IS-41 CELLULAR RADIOTELEPHONE COMMUNICATIONS INTERSYSTEM OPERATIONS. Communications between HLR 4 and customer service data base 10, is not standardized and is proprietary to the HLR and/or customer service data base manufacturers.

Despite the fact that a standard exists for communications between HLR 4 to MSC 2, common practice is that this interface becomes proprietary due to proprietary enhancements made by the MSC vendors (which typically also supply the HLR). These enhancements are driven by the relatively long time it takes to modify IS-41, and the need to tailor new features provided by MSC 2 on a per subscriber basis. The indication of such tailoring is kept in HLR 6. For example, if a new subscriber feature is introduced in MSC 2, the records in HLR 6 must, at the very least, indicate whether the user is allowed to make use of the new feature, and if so, whether the user has activated the feature. This data is kept in the subscriber profile which now needs modification.

A primary service provider that markets its facilities to secondary service providers has two choices. A first option open to the secondary service provider is depicted in FIG. 2. The figure shows multiple HLRs (22A–22N), each associated with a secondary service provider. Each of HLRs (22A–22N) is configured and managed by a particular reseller. The reseller HLR (22A–22N) is connected to the reseller's customer service data base (24A–24N) similarly to what a "conventional" (primary only) service provider would do. The advantage of this configuration is the fact that the HLR to MSC interface is standardized, and that different resellers do not have access to each other's customer information thus providing the necessary business protection.

FIG. 3 shows a single HLR 32 connected to multiple customer service data bases (34A–34N) on one side, and to a single MSC 30 on the other. The advantage of this configuration is twofold: this model conforms with the IS-41 network model, thus shielding the MSC from some of the new requirements pertaining to use by multiple service providers and at the same time, allows the existing practice of enhancing the interface between the MSC and the HLR, making it possible to quickly bring to market new MSC features. The problems with this approach are:

Potentially, different service providers may access and alter subscriber records that do not belong to them.

The interface between HLR 32 and customer service data base (34A–34N) is proprietary. Therefore, a potentially large number of secondary service providers and a number of MSC/HLR vendors will have to coordinate every time this interface must be modified, in essence providing an ad-hoc standardization forum. This approach will again significantly slow the process of modifying subscriber records of HLR 32, slow the introduction of new features, and make the primary and secondary service providers less competitive when compared to a primary only service provider that has both interfaces (C and P) under its control.

SUMMARY OF THE INVENTION

The present invention provides an HLR Interface Facility (HIF) disposed between the HLR and the different customer service data bases. The HIF resolves the two problems associated with the single HLR solution. It provides controlled access to the HLR, preventing secondary service providers from accessing or modifying each other's subscriber records.

The HIF also offers interworking facilities, allowing to independently modify the interface into the HLR, and the new interface point between different customer service data bases and the HIF. Therefore, if a new feature is introduced in the MSC and only some of the secondary service providers wish to make use of it, only the interfaces between their customer service data bases and the HIF need modification while the other resellers need not change their own interfaces to the HIF.

In addition, a similar idea can be extended to interfacing the billing output of the MSC to the multiple billing centers. Each secondary service center will have its own billing center and each one of them needs to be connected to the MSC. In the second exemplary embodiment, a Generalized Interface Facility (GIF) provides the HIF functionality and in addition connects the billing output to multiple billing centers (this can be the same or a separate physical box than the HIF). For billing purposes, the GIF can help resolve the association between a subscriber's number and the identity of his/her secondary service provider.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
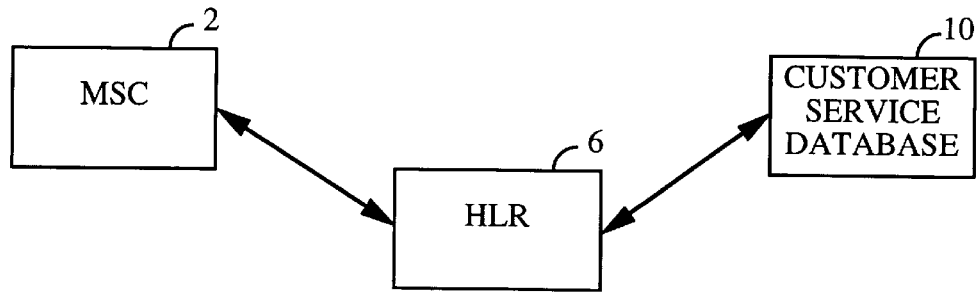
FIG. 1 is a block diagram illustrating the connections in the common case of a single service provider using an MSC.
Figure 2:
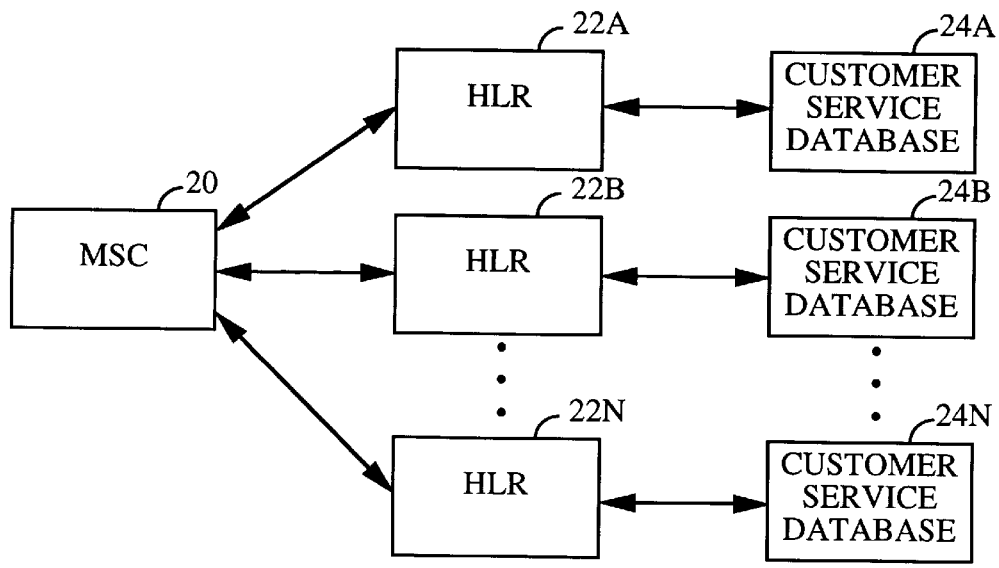
FIG. 2 is a block diagram illustrating a first solution for a primary service provider which markets its facilities to secondary service providers.
Figure 3:
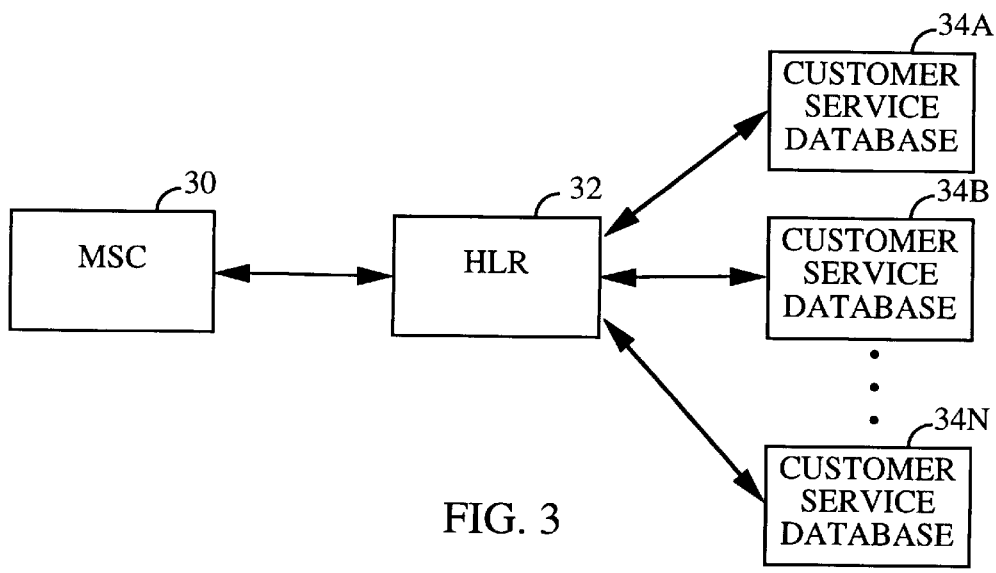
FIG. 3 is a block diagram illustrating a second solution for a primary service provider which markets its facilities to secondary service providers.

FIG. 3 is a block diagram illustrating the infrastructure of the present invention. The exemplary embodiment of the present invention is described for illustrative purpose in the context of a subscriber station requesting a new service or change of service. It will be understood by one skilled in the art that the present invention is equally applicable to any situation where a query is made of information traditionally stored in the home location register (HLR) database.

When the user of subscriber station 40 wishes to initiate a service, a service request message is transmitted from mobile station 40 to base station 42. The request for a service may take place either at the calls initiation or during an ongoing service. In the exemplary embodiment the service request message is transmitted by mobile station 40 to base station 42 using a CDMA modulation format as is described in detail in the aforementioned U.S. Pat. Nos. 4,901,307 and 5,103,459.

In the exemplary embodiment, if the service is requested at start up the service request message is transmitted by mobile station 40 over the access channel. The use of signaling over an access channel is described in detail in copending U.S. patent application Ser. No. 08/219,867, entitled "APPARATUS AND METHOD FOR REDUCING MESSAGE COLLISION BETWEEN MOBILE STATIONS SIMULTANEOUSLY ACCESSING A BASE STATION IN A CDMA CELLULAR COMMUNICATIONS SYSTEM", filed Mar. 30, 1994 and in copending U.S. Pat. No. 5,392,287 entitled "APPARATUS AND METHOD FOR REDUCING POWER CONSUMPTION IN A MOBILE COMMUNICATIONS RECEIVER", both of which are incorporated by reference herein.

The request message is received at base station 42 and demodulated and decoded by base station 42 and provided to mobile switching center 44. The demodulation and decoding of a CDMA message is described in detail in the aforementioned U.S. Pat. Nos. 4,901,307 and 5,103,459. Typically, data is provided from base station 42 to mobile switching center (MSC) 44 by means of wireline communications, although clearly the communication between base station 42 and MSC 44 can be performed using wireless communications.

In response to the received service request message, MSC 44 generates a database query message. The database query message may, for example, seek to determine whether the user of subscriber station 40 subscribes to the service requested in the service request message or the database query may seek to authenticate the user of subscriber station 40 before providing an expensive service. MSC 44 directs the service request message to home location register 46. In the exemplary embodiment, HLR 46 and MSC 44 communicate using standardized messaging protocol. In the exemplary embodiment the standardized protocols used for communications between HLR 46 and MSC 44 is described in the aforementioned TIA standard IS-41.

In the exemplary embodiment, HLR 46 contains a record relating to the subscriber station 40. Typically, the record within the HLR is identified by the electronic serial number (ESN) and mobile identification number (MIN) which are provided to HLR 46 from MSC 44. In the exemplary embodiment, HLR 44 maintains a record only containing the minimum amount of information regarding the user of mobile station 40 that is necessary to comply with IS-41. Thus, sensitive and noncritical information such as the subscriber's address need not be maintained within HLR 46.

In response to the query from MSC 44, HLR 46 determines whether the queried information is maintained within its record of subscriber station 40. Should HLR 46 determine that some of the information requested is not stored within its database, HLR 46 transmits the query message to HLR Interface (HIF) 48, requesting information that is necessary for performance of the service requested by mobile station 40 but which is not maintained in HLR 46.

In response to the query message from HLR 46, HIF 48 directs the query message to the appropriate one of customer service database 50A–50N, either in accordance with information maintained in the customer's record maintained in HLR 46 or in accordance with information in the received at the MSC such as the subscriber station's ESN and MIN.

In addition to directing the service request message to the appropriate one of customer service databases 50A–50N, HIF 48 also performs a translation function. HIF 48 translates the query message that is of the standardized protocol used for communications between MSC 44 and HLR 46 to a proprietary protocol known only to the service provider of subscriber station 40.

The translation function performed by HIF 48 provides two separate and important functions. First, additional security is provided by providing a proprietary interface between HIF 48 and the respective customer service databases 50A–50N because the protocol is known only to the individual service provider and the operator of HIF 48, referred to herein as the secondary service provider. Second, when MSC 44 is modified to provide an additional service option, the corresponding changes need to be made to the protocol for communication between MSC 44 and HLR 46. However, HIF 48 buffers customer service databases 50A–50N from the changes regarding the protocol between MSC 44 and HLR 46. HIF 48 can be modified in its translation so as to make the changes in the communications between MSC 44 and HLR 46 invisible to all but those service providers who wish to take advantage of the new service option offered by MSC 44. This is particularly straightforward since the owner and operator of MSC 44 is the owner and operator of HIF 48.

In response to the query provided by HIF 48, information is provided by a selected one of customer service databases 50A–50N. The information provided by the selected one of customer service databases 50A–50N is provided using a proprietary protocol. HIF 48 receives the query response and translates message to standardized messaging protocol. The translated query response message is provided to HLR 46. In the exemplary embodiment, HLR 46 may combine the information retrieved from the selected one of customer service databases 50A–50N with any information queried that is maintained within its database and provides that information in accordance with a standardized protocol to MSC 44.

Figure 5:
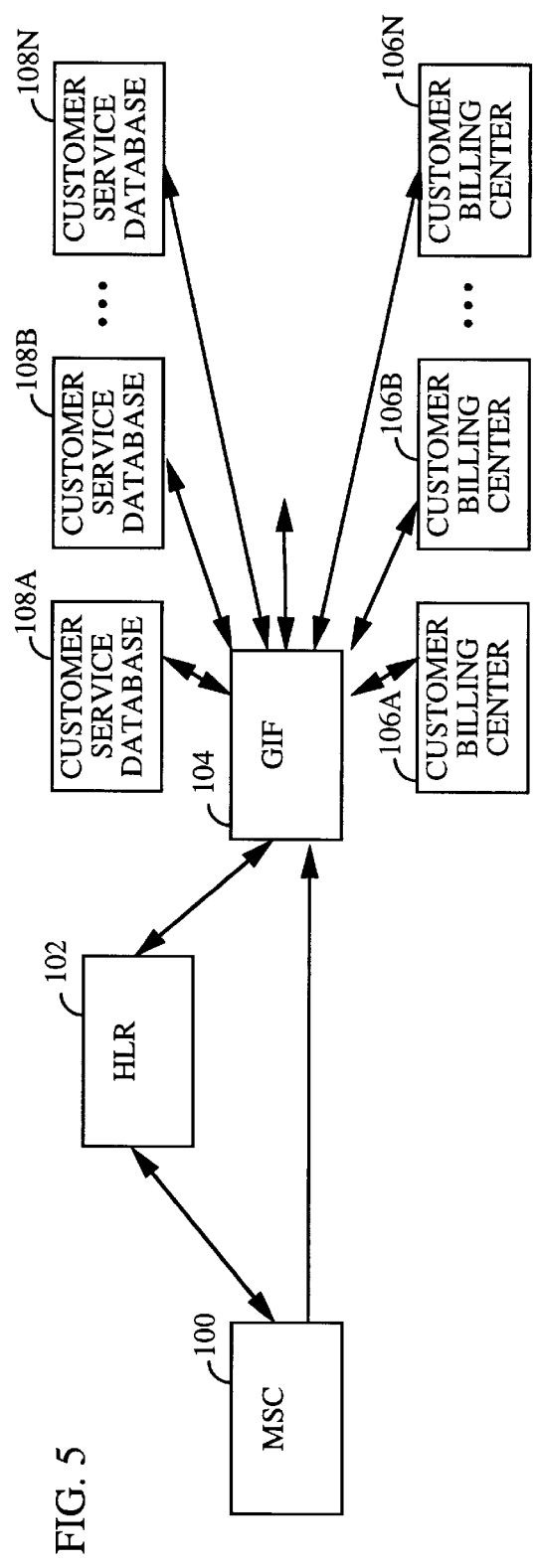
FIG. 5 is a block diagram illustrating the solution of the present invention with additional functionality to assist in billing.

FIG. 5 illustrates an extended implementation of the present invention wherein the home location interface is generalized so as to provide an interface to be used for billing purposes. In queries relating to information particular to subscriber station 40, MSC 100 communicates with HLR 102 in accordance with a standardized protocol. In the exemplary embodiment, HLR 102 maintains the minimum amount of information necessary to conform with the IS-41 standard. HLR 102 communicates queries using a modified version of standardized protocol to general interface (GIF) 104. GIF 104 translates the database query to proprietary query using the proprietary protocol of the service provider to whom the query is directed. The query using the proprietary protocol is directed to a selected one of customer service databases 108A–108N.

The requested information is provided in accordance with a proprietary protocol to from the one of customer service databases 108A–108N. The requested message is translated by GIF 104 to the modified standardized protocol of HLR 102. HLR 102 may simply pass the information to MSC 100 or may combine it with information within its database.

In addition, MSC 100 provides billing information to GIF 104. In response to the billing information, GIF 104 translates the billing information provided in a modified standardized protocol to a selected one of customer billing centers 106A–106N.

Figure 4:
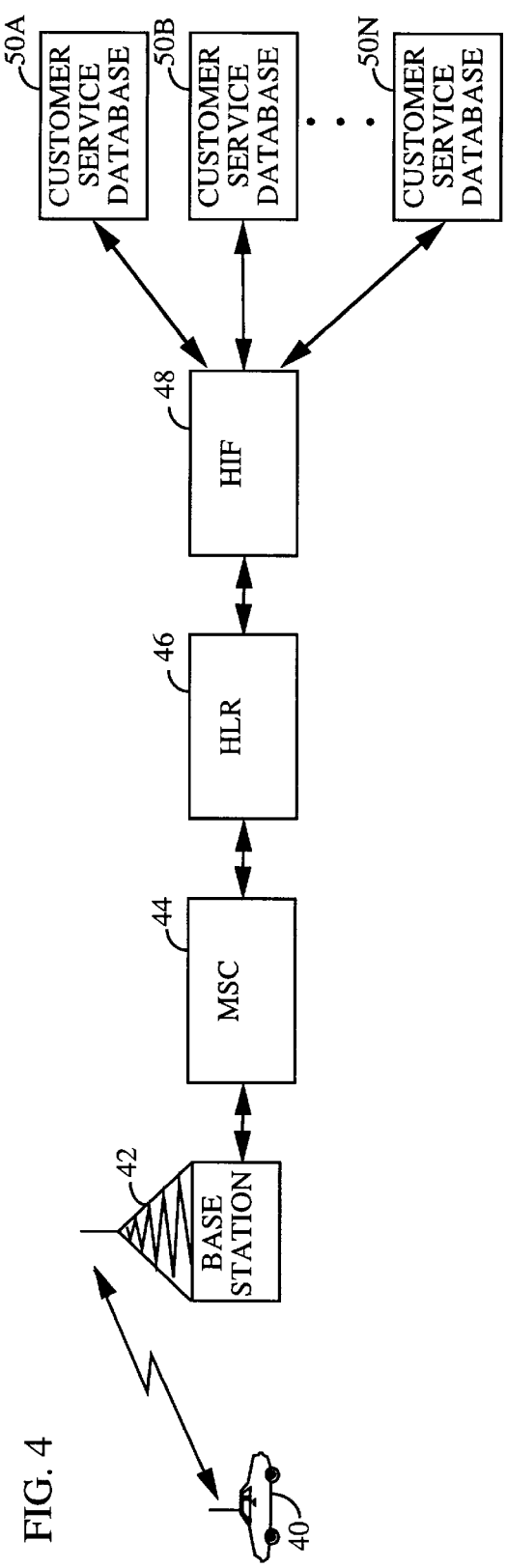
FIG. 4 is a block diagram illustrating the solution of the present invention for a primary service provider which markets its facilities to secondary service providers.

GIF 104's translation function with reference to billing provides parallel benefits to those provided by HIF 48 of FIG. 4. GIF 104 allows the link between MSC 100 and customer billing centers 106A–106N increases security for the customer billing centers. The use of a proprietary protocol for commands into customer billing centers 106A–106N reduces the possibility of fraudulent tampering with billing and prevents one service provider accessing billing records of another service provider. In addition, when new features are added to MSC 100, new billing rates will accompany those features and as described above the change will be transparent to all but those providers who elect to provide the additional service. The billing information is translated to a proprietary format by GIF 104 and provided to a customer billing center 106A–106N.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. In a communication system wherein a plurality of service providers use a mobile switching center to provide service to a subscriber of one of said plurality of service providers, an apparatus for providing database information for said subscriber to said mobile switching center, comprising:

a plurality of customer service databases wherein each of said customer service databases contains information regarding the subscribers of one of said plurality of service providers, wherein said information is stored in each of said databases in accordance with a different protocol; and a general interface coupled to each of said plurality of customer service databases and to a home location register, wherein said general interface receives said database information in said different protocols and translates said database information from said different protocols to a standardized protocol.

2. The apparatus of claim 1 further comprising a home location register coupled to said general interface comprising a data record for said subscriber wherein said record includes a minimum of information on said subscriber necessary to comply with a standardized protocol.

3. The apparatus of claim 2 wherein one of said plurality of customer service databases contain information regarding said subscriber but exclusive of said information in said home location register.

4. The apparatus of claim 1 further comprising:

a plurality of customer billing databases wherein one of said plurality of customer billing databases contains a billing record for said subscriber; and wherein said general interface is coupled said plurality of customer billing databases.

\* \* \* \* \*